Aug. 24, 1937.         G. G. BATES         2,091,064
FRUIT CLEANER AND POLISHER
Filed May 15, 1935
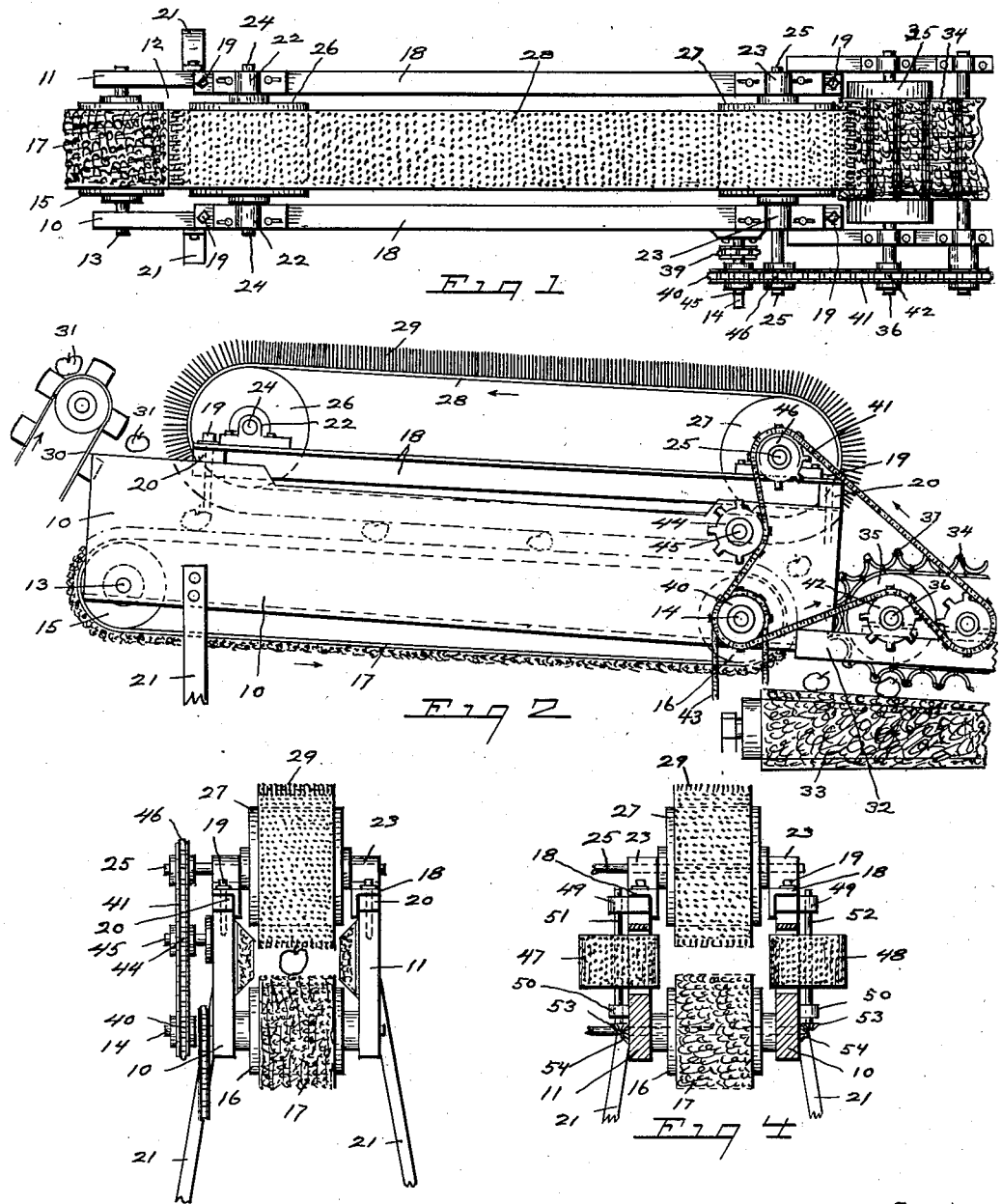

Patented Aug. 24, 1937

2,091,064

UNITED STATES PATENT OFFICE 2,091,064

FRUIT CLEANER AND POLISHER

George G. Bates, Kingston, N. Y.

Application May 15, 1935, Serial No. 21,507

1 Claim. (Cl. 146—202)

My present invention relates primarily to a machine for cleaning and polishing fruit and the like, and is an improvement over the construction and combination of parts which are described and claimed in United States Patents Nos. 1,811,991 and 1,924,098, issued to me on, June 30, 1931, and August 29, 1933; and the present invention relates more particularly to a novel construction and application of the cleaning and polishing means employed.

In my above referred to Patent No. 1,924,098 while I have indicated the use of endless belts for both the cleaning and polishing of the fruit, I have not gone into the detailed construction of these belts or their manner of mounting and these novel features are what forms the subject matter of my present invention.

In the cleaning and polishing of fruit and especially fruit of a delicate nature, such as some varieties of apples which have a very tender skin, the fruit must be handled in a delicate manner and the application of the cleaning means must be light and yet of sufficient power to remove the dirt from the fruit, and it has been found, that the ideal means for this purpose is a soft bristle brush, so mounted that its pressure upon the fruit can be adjusted to take care of the different sizes of fruit and local conditions.

Some attempts have been made to employ bristle brushes for this purpose, but the bristles have either been mounted in a roller adapted to be rotated against the fruit, which does not provide any resiliency or soft brushing effect against the fruit, or the bristles have been mounted in the form of solid back brushes, which are in turn mounted upon a reciprocating device which is given a scrubbing effect against the fruit, which is very injurious to the tender fruit, or the solid back brushes are secured upon an endless belt which is carried along in contact with the fruit.

In the case of the solid back brushes being mounted upon a traveling endless belt, it will be seen, that as the belt travels around the end rollers, the brushes are moved apart from each other owing to the curvature of the belt and this produces V-shaped openings between the adjacent brushes into which the fruit will enter from the feeder and will be carried along the entire length of the cleaner preventing the fruit which has become caught between the brushes from being cleaned as it can not roll upon the conveyor belt, and the brushes can not have any wiping contact therewith.

This same condition is true of any form of bristle brush in which the bristles are mounted in bunches either upon a solid backing or upon a belt, as openings are formed between the bunches as the belt travels around the supporting roller.

To overcome this and other objections, I have in my present invention, devised means whereby the bristles always present to the fruit an unbroken front of wiping contact, as the bristles cover the entire surface of the flexible belt and are not bunched or mounted on a solid unyielding backing.

I have also provided a novel construction of polishing belt for imparting a luster to the fruit after the same has been cleaned.

The object of the invention is to provide a novel means for cleaning the fruit during its passage through the machine, which shall be efficient without exerting undue pressure upon the fruit and without danger of damaging or bruising the skin of the fruit.

Another object of the invention is to provide means whereby the distance between the conveyor belt and the cleaning belt may be adjusted for fruit of different sizes.

Another object of the invention is to provide means for polishing the fruit after the same has been cleaned and during its travel through the machine.

Another object of the invention is to provide a cleaner and polisher that is simple, durable and efficient, containing few parts which may be readily renewed.

Another object is to provide a cleaning bristle brush belt of flexible material and in which the bristles present an unbroken surface to the fruit at all times and in all positions and which prevent the fruit from becoming lodged therein.

Another object of the device is to provide means whereby in addition to the conveyor belt and the cleaning or polishing belt, other belts may be employed and which are mounted edgewise upon the sides of the machine in such a manner that they will come into contact with the fruit as it is carried therethrough and will assist in the cleaning and polishing.

With these and other objects in view, my invention consists in certain novel construction and combination of parts as will hereinafter be fully described and claimed, and further illustrated in the accompanying drawing which forms a part hereof, and in which like figures of reference refer to corresponding parts in all of the views, and it is understood that slight changes may be made without departing from the spirit of the invention.

In the drawing:

Figure 1 is a top plan view of one unit of a cleaning and polishing machine, and in which is shown my novel construction.

Figure 2 is a side elevation of the same, partly in section, and also indicating the elevator for feeding the fruit to the cleaner unit, and the polishing and sizing unit.

Figure 3 is a cross sectional view of the same unit.

Figure 4 is a cross sectional view of a similar unit, but with the addition of the side belts thereto.

Referring to the drawing:

I have only deemed it necessary to herewith illustrate a single unit of the cleaning and polishing machine, as this unit may be used for cleaning fruit without the addition of any other parts of the machine, or it may be used in connection with a grader, polisher or packer, or in any other desired combination, or the combination of belts employed may be used in a polisher, or other part of the machine.

The unit herewith shown comprises the two sides 10 and 11, which are secured together by a bottom 12 in the form of a trough, and adjacent the ends thereof are rotatably mounted the two transverse shafts 13 and 14, upon which are mounted the rollers 15 and 16, upon which is carried the conveyor belt 17 which is made from such material as carpet or the like to form an endless belt, and should the trough be of any great length, this belt may be supported along its length upon idler rollers suitably mounted in the sides 10 and 11, and one or both of the bearings for said shafts 13 and 14 are mounted in the sides 10 and 11 in an adjustable manner to provide for take-up of the belt. This belt 17 to be moved by rotating the shaft 14 in some suitable manner.

Upon the upper edges of the sides 10 and 11 are mounted in an adjustable manner two parallel rails 18, which are secured to the sides 10 and 11 by the bolts 19 passed therethrough and threaded into the sides 10 and 11, while blocks 20 of different thicknesses are placed between the rails 18 and the sides 10 and 11, in such a manner that the inclination or incline of the rails 18 may be varied as desired, the whole unit being mounted upon an incline and supported upon the legs 21.

These rails 18 have secured thereto the bearings 22 and 23 in an adjustable manner, such as providing elongated holes therein for bolts securing them to the rails, and rotatably mounted within these bearings 22 and 23 are the transverse shafts 24 and 25, which carry the rollers 26 and 27, upon which are mounted the endless bristle brush belt 28.

This endless bristle belt is formed of a belt of leather or other suitable flexible material and to which are secured the bristles 29 in small bunches which are staggered over the surface of the belt in such a manner that as the belt travels over the rollers 26 and 27, the ends of the bristles present an unbroken front; that is they do not part as is the case where they are attached to the belt in large bunches spaced apart, whereby large openings are formed between the adjacent bunches into which the fruit can enter and be thus carried along by the belt without having a chance to be turned over and cleaned during its travel.

Such a construction of belt also provides a soft brushing contact with the fruit and not a hard knock as is the case where a bunch of bristles hits the side of the fruit and as is the case where the bristles are mounted upon solid backs which are in turn secured to a belt.

This endless bristle brush belt 28 is spaced from the conveyor belt 17 and the distance between them may be varied by the thickness of the spacing blocks 20 which are employed between the rails 18 and the sides 10 and 11, so that fruit of different size can be taken care of. While it is intended that the belt 28 shall travel in an opposite direction from that of the belt 17, this can be changed if desired and both belts run in the same direction.

In Figure 2, the upper end of an elevator 30 is indicated, which carries up the fruit 31 and delivers it to the conveyor belt 17.

Adjacent to the other end of the unit is indicated the end of a polishing and sizing unit 32, which has the sizing rollers 33, and the polishing belt 34 which is mounted upon a pair of rollers 35 on the shafts 36 (only one roller and shaft being shown) which are rotatably mounted in the unit.

This polishing belt 34 is made up of a flexible fabric endless belt upon which are mounted strips of plush or other suitable material in the form of humps 37 which also act as a conveyor for carrying the fruit along and imparting to it a rolling movement.

While any suitable means may be employed for moving these belts, I have here shown mounted upon the shaft 14 a sprocket 39 which is driven by the chain 43 from a motor; and upon the shaft 14 is secured another sprocket 40, which carries the chain 41 which travels over a sprocket 42 on the shaft 36, under the sprocket 40 on the shaft 14, past an idler sprocket 44 on a stud 45 mounted upon the side 10; around the sprocket 46 on the shaft 25 and so back to the sprocket 42, thus rotating the shafts as indicated.

As shown in Figure 4, I have added to this arrangement the two additional belts 47 and 48 which are mounted upon the vertical shafts 51 and 52 in the bearings 49 and 50, and which are rotated by the bevel gears 53 and 54 from the shaft 14.

Having thus described my invention, what I claim as new and desire to secure by Letters Patent, is:

In a fruit cleaner or the like, the combination with a trough-shaped supporting means, having a flexible endless conveyor belt mounted therein and adapted to convey the fruit therethrough, of a flexible endless bristle brush cleaning belt mounted above and in adjustable relation with the conveyor belt, and a pair of side flexible endless bristle brush cleaning belts mounted in the sides of the supporting means, means for imparting travel to said side belts in either direction, and means for preventing any movement of said side belts.

GEORGE G. BATES.